United States Patent [19]

Morgan et al.

[11] 4,229,789
[45] Oct. 21, 1980

[54] SYSTEM FOR TRANSFERRING DATA BETWEEN HIGH SPEED AND LOW SPEED MEMORIES

[75] Inventors: Douglas J. Morgan, Stanford, Calif.; Barry S. Manis, Fairfield, Conn.

[73] Assignee: NCR Corporation, Dayton, Ohio

[21] Appl. No.: 863,637

[22] Filed: Dec. 22, 1977

[51] Int. Cl.³ .......................... G11C 9/06; G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,217,298 | 11/1965 | Kilburn et al. | 364/200 |
| 3,394,353 | 7/1968 | Bloom et al. | 364/200 |
| 3,422,401 | 1/1969 | Lucking | 364/200 |
| 3,427,592 | 2/1969 | Bahnsen et al. | 364/200 |
| 3,525,985 | 8/1970 | Melliar-Smith | 364/200 |
| 3,541,529 | 11/1970 | Nelson | 364/200 |
| 3,573,750 | 4/1971 | Ishidate | 364/200 |
| 3,958,228 | 5/1976 | Coombes et al. | 364/200 |
| 4,008,460 | 2/1977 | Bryant et al. | 364/200 |
| 4,121,286 | 10/1978 | Venton et al. | 364/200 |

OTHER PUBLICATIONS

Llewelyn et al., "Least Recently Used Recorder" in *IBM Technical Disclosure Bulletin*, vol. 14, No. 8, Jan. 1972, pp. 2368-2369.

*Primary Examiner*—Melvin B. Chapnick
*Attorney, Agent, or Firm*—J. T. Cavender; Edward Dugas; Stephen F. Jewett

[57] ABSTRACT

A data transfer or replacement system for shifting blocks of data or pages between a high speed, low capacity, working memory and a low speed, high capacity backup store of a data processing system. Each block in the working memory is associated with an "A" and a "B" single bit register. Usage bits are initially inserted into the "A" registers as information from the block is utilized. After one-half of the "A" registers have been identified by associated usage bits, the "B" single bit registers are cleared, and usage bits are inserted into these "B" registers. When one-half of the "B" usage registers are "marked", the "A" registers are cleared and usage bits are then inserted in these "A" registers. Upon the necessity for introduction of additional data from the backup store into the high speed, low capacity working memory, least recently used blocks are identified as those whose associated "A" and "B" registers have not been marked. The new blocks of information are transferred from the backup store into one of the spaces in the high speed store containing such a block of least recently used data.

5 Claims, 5 Drawing Figures

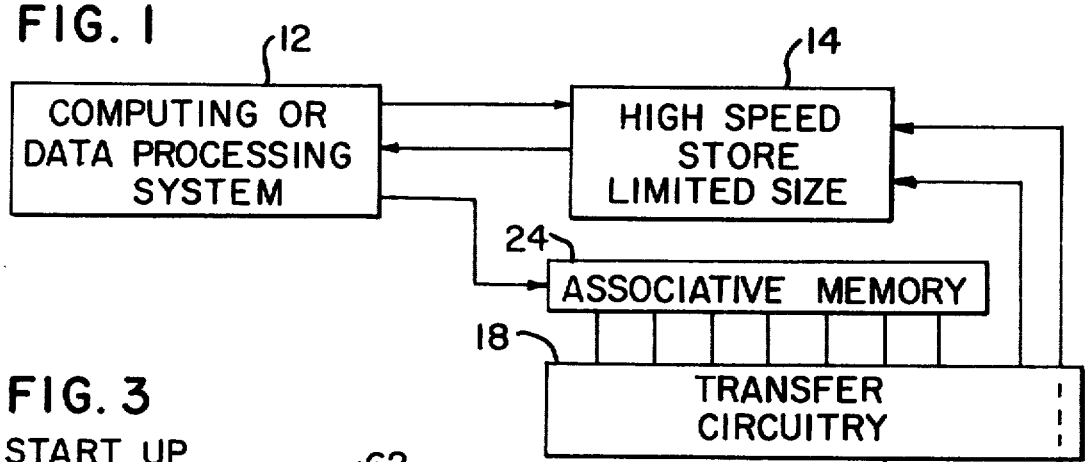
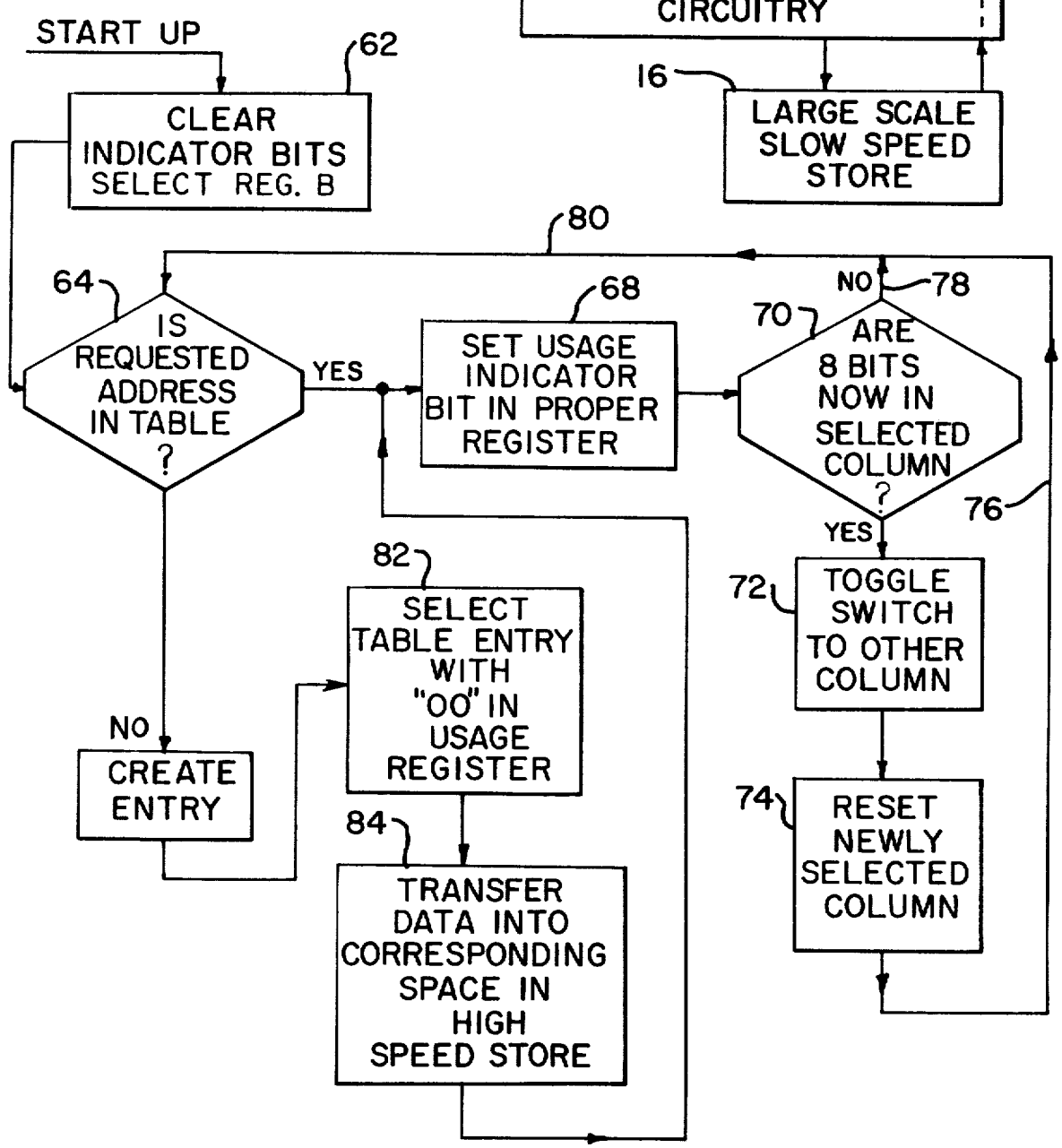

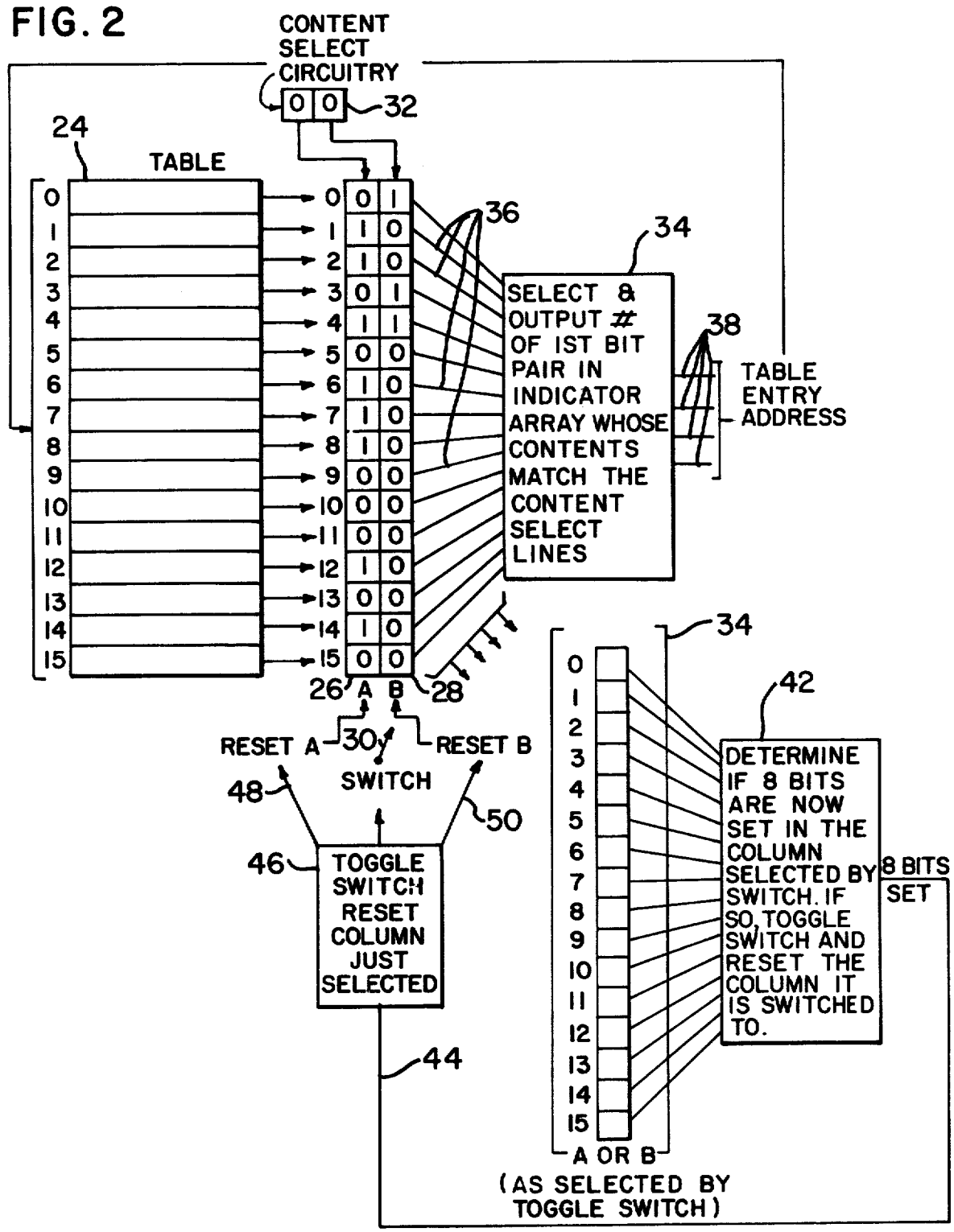

SYSTEM FOR TRANSFERRING DATA BETWEEN HIGH SPEED AND LOW SPEED MEMORIES

BACKGROUND OF THE INVENTION

This invention relates to a transfer system, and more particularly to a system which selects the location in high speed, low capacity working store into which a block of information from a low speed large capacity backup store is to be located.

When a situation exists where there is a set having a fixed number of members, a problem arises as to which member to replace when the set is full and it is desired to add a new member. This invention provides an economical solution to the replacement problem when the members of the set are being utilized in a manner involving a higher probability of re-use of recently utilized blocks of information and applies the solution to a specific problem arising with respect to the memory system of a large data processing system.

Various techniques are known whereby several computer programs, executed either by a single central processing unit or by a plurality of processing units, share one memory. A memory being shared by programs in this manner requires an extremely large storage capacity, a capacity which is often larger than its actual capacity of the immediately associated compatible store. To accommodate this situation, the concept of "virtual storage" is employed. This virtual storage is divided into segments or blocks. Each block or segment may include several pages which may be located randomly throughout main storage and swapped in and out as they are needed.

In an electronic computer, it is desirable to store all information in such a manner that it be immediately available for control and processing. To achieve the fastest processing, the best storage apparatus would be one having a capacity at least as large as required for handling the largest possible problem and the highest possible speed. However, because high speed memory is expensive, other alternatives to a very large high speed memory have been proposed. One economical and workable solution to the problem involves the use of a large capacity, low speed store, which has sufficient capacity to store all the information required for any desired problem. A low capacity, high speed store is also provided and all programs are written as if all the information were in a high speed store having the extensive capacity of the entire low speed store. The entire system of page transfers and replacement is thereby rendered "transparent" to the programmer.

As part of the transfer, or replacement system for such a virtual memory storage arrangement, a third "associative memory" is provided to indicate which low speed stored data is also contained in the high speed store at any given time. When a given program running on the computer requires a particular word of information, a check is made to see if this word is in the high speed store. If it is in the high speed store, the information is immediately retrieved and used. If the word is not in the high speed store, the required word is transferred from the low speed backup store to the high speed store. It has been found impractical to make this exchange on a single word basis in the course of sequential execution of the various instructions of a given program, due to the slow speed of the backup store. The time delay involved in making the transfer has been found to be almost independent of whether a single word or a block of words is transferred. Further, experience has shown that the probability is high that if one word is required, others in its locality will also be needed during the course of the execution of instructions of the requesting or bidding program. Therefore, when a determination is made that a word of information is required from backup store, a transfer of the block containing this word is made from the backup store into the high speed store.

The mechanization of low speed to high speed core transfer of blocks of data described in the previous paragraph is only effective for so long as there are empty blocks of addresses in high speed store. When the high speed store is full, a replacement problem arises. When replacement of an information block is required, an ideal replacement criteria would always cause the block of information which is not going to be used again for the longest period of time to be replaced. Unfortunately, an actual determination according to this criteria during the course of execution of competing or bidding is unduly time consuming and thus impractical. Existing systems, which have either selected the block to be replaced randomly or have made the selection on a first-in, first-out (FIFO) basis, have fallen far short of the ideal.

More recently there have evolved alternatives to a first-in, first-out algorithm implementation such as those taking into account the relative utilization of the members of a fixed length set. Relative utilization criteria ideally involve dynamically ordering the blocks of information (i.e. members of the set) according to the sequence of references to them, and when the necessity arises to replace a block, replacing the block to which reference has not been made for the longest period of time. This system utilizes the empirically determined fact that the blocks of information which have been most recently referred to are most likely to be referenced in the near future. Although it is known that implementation of replacement systems subject to these criteria provides good results on a wide variety of replacement or relocation problems, it has been determined that full and rigorous implementation of this criteria is a relatively costly procedure involving extensive additional electronic equipment.

An alternative to dynamic reordering is included in the system of U.S. Pat. No. 3,541,529 issued to Robert A. Nelson, et al. which discloses marking each block as it is utilized or altered and selecting for replacement only unmarked blocks. When the set of unmarked blocks vanishes, a mechanism is provided for unmarking all the blocks or all but the last block and then proceeding as before.

Another heuristic approach to storage paging is that described in both "Automatic Heuristic Storage Paging Mechanism" by M. I. Davis, IBM Technical Disclosure Bulletin, Volume 16, No. 1 June 1973. A heuristically adaptive address translator control storage arrangement is provided which is transparent to software so that virtual storage operations are effected with induced software overhead loading. By "heuristically adaptive" is meant alterable activity indicator set each time a given page is accessed. A heuristically decaying activity plot is maintained within the address translator.

In general, therefore, the prior art has disclosed systems which either (1) maintain detailed historical information, at great expense, to provide a rigorous "least recently used" replacement formula, or (2) are subject at least at some time to replacing a block of data which has very recently been accessed (and is likely to be needed soon), at a considerable cost, on the average, of computer time.

A principal object of the present invention, therefore, is to entirely preclude replacement of at least the 50% of the information blocks or pages which have been most recently used and concurrently avoid significant increases in hardware or data processing costs.

SUMMARY OF THE INVENTION

In accordance with the present invention, an inexpensive system is provided for implementing a "Least Recently Used" criterion in replacing pages in a high speed low capacity memory from a large scale, low speed store. Instead of keeping exact track of the order of accessing each "page" or block of information from the high-speed memory, with the associated high cost, the present system uses simple "A" and "B" single binary digit (or "bit") registers associated with a "page" of data in the high-speed memory. Initially, usage indicating bits are inserted into the "A" registers associated with each referenced "page", until half of the "A" registers are filled. Then the "B" registers are cleared and usage indicating bits are inserted into the "B" single bit registers associated with each referenced page. Now, when a page must be selected for replacement, the "A" and "B" registers are scanned, and any page having no "A" or "B" usage bits is selected for replacement. After half of the "B" registers are filled, the "A" registers are cleared and the process is continued.

The present system has the advantage of securing most of the benefits of a rigorous selection of the "least recently used" page in the high speed memory for replacement, while using very little additional logic circuitry than a random selection system would entail. More specifically, the present system insures that the "page" or block of information selected for replacement will not be selected from the fifty percent (50%) of the total pages which have been most recently used, and on the average will select from the least recently used twenty-five percent (25%) of the pages, in the high speed memory.

On a more general basis, the present invention involves a computing system having a small, high-speed store and a large scale slow-speed store; and each of at least a portion of the "pages" or blocks of information in the high-speed store has associated with it register arrangements and associated logic circuitry for selecting a "page" for replacement which is not among the at least fifty percent of the "pages" in the high-speed store which have been most recently accessed, and for selecting from among the remaining fifty or less percent, based on those which have not been accessed at a time following a predetermined switching instant.

Other objects, features, and advantages of the invention will become apparent from a consideration of the following detailed description and from the accompanying drawings.

BRIEF DESCRIPTION OF THE DRAWINGS

FIG. 1 is an overall block diagram showing the type of system in which the present invention is employed;

FIG. 2 is a diagrammatic showing of an illustrative system implementing the present invention;

FIG. 3 is a logic flow chart describing the sequence of operation of the system shown in FIG. 2.

DETAILED DESCRIPTION

Figure 4A:
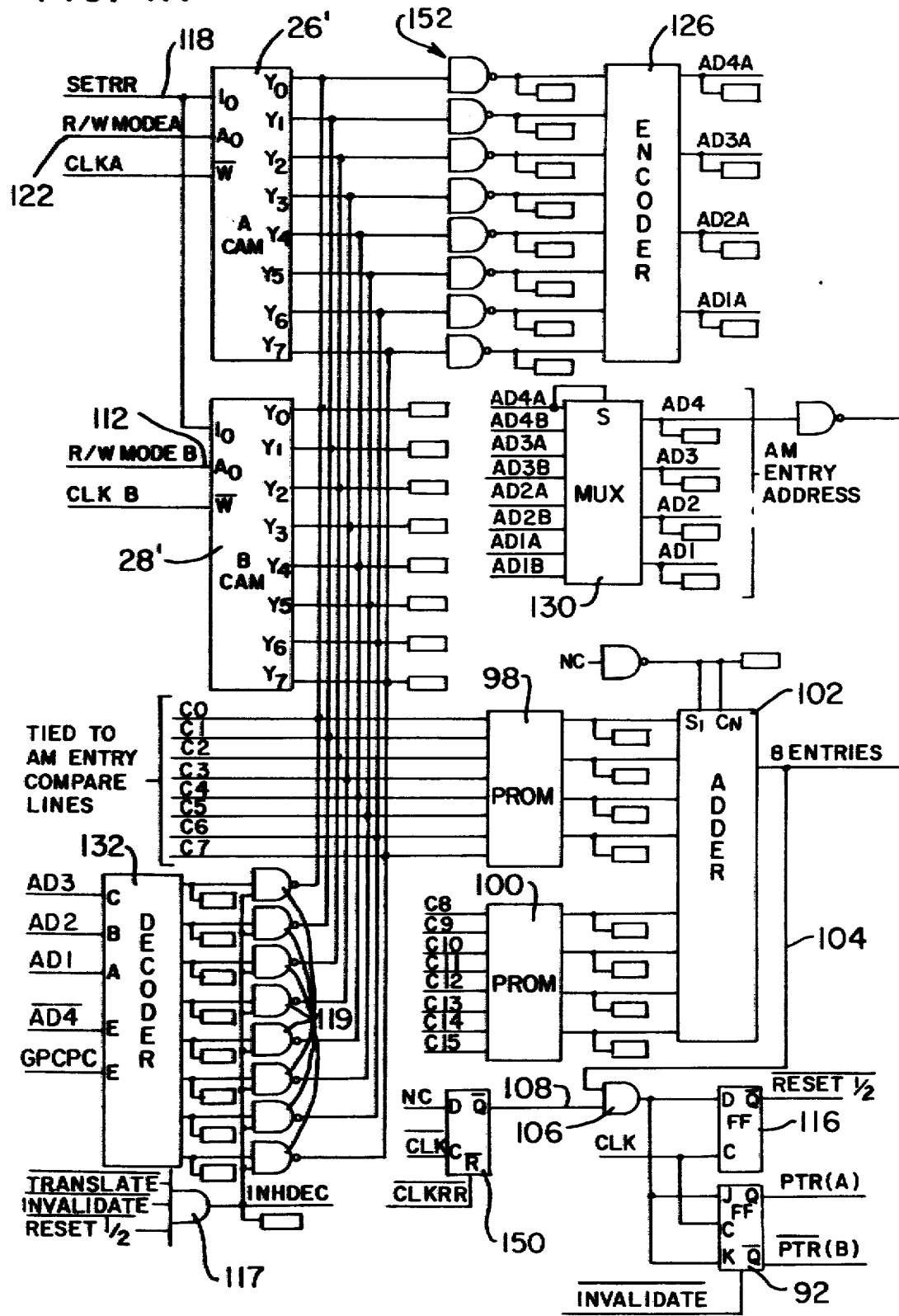
FIGS. 4A and 4B are a schematic logic diagram showing an illustrative implementation of the present invention.

Referring more particularly to the drawings, FIG. 1 shows a data processor including a computing system 12 and a high speed or buffer memory or store 14 for communicating information to and from the computing system 12. A large size or backup memory or store 16 provides the capacity for storing digital information which is not provided by the high speed store 14. For each problem which is undertaken by the computing system 12, information is transferred from the large size backup store 16 to the high speed memory 14. In many cases, certain blocks of information from the store 16 are regularly used by the computing system 12 and are therefore held in the high speed store 14. Blocks of digital information, or "pages" of such information are normally transferred as a unit from the slow speed store 16 to the high speed memory 14.

As mentioned in the introduction, it has been determined that blocks of digital information, or "pages" which have been recently accessed by the computing system 12 are more likely to be called up again in the near future. Accordingly, the transfer circuitry 18 and the associative memory 24 include the logic circuitry which selects blocks of information from the high speed store 14 which have not been used recently, when additional information must be entered into the high speed store 14 to provide needed information to the data processing system 12.

Incidentally, the present invention is primarily directed to the transfer circuitry 18 and the associative memory 24. The overall system as shown in FIG. 1 with a different form of transfer circuitry is included in a data processing system sold under the tradename CRITERION 8550 or 8570, available from the NCR Corporation, Dayton, Ohio 45479.

Figure 4B:
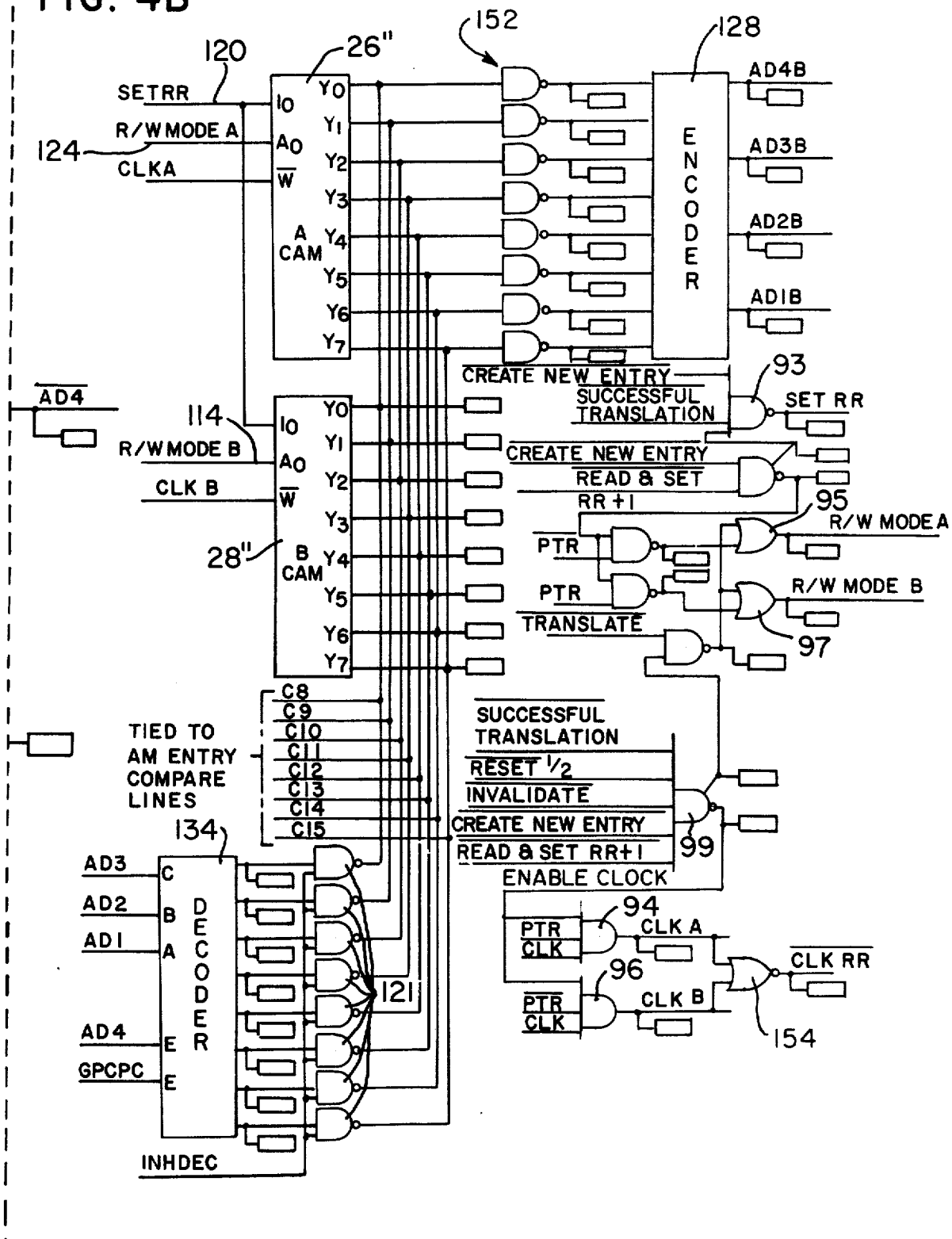

The mode of operation of the transfer circuitry 18 and the associative memory 24 will now be considered in greater detail in connection with the conceptual diagram of FIG. 2, the logic or program flow chart FIG. 3, and the detail logic circuit diagram of FIGS. 4A and 4B.

Referring to FIG. 2, the associative memory is indicated by the block 24 with indicated spaces for 16 addresses or blocks of information in the high speed store 14 of FIG. 1. The associative memory 24 includes in each of the 16 locations the address in the large scale memory 16 from which the information stored in each section of the high speed store was derived. Associated with each of the blocks of information referred to in the associative memory 24, are the (A) single bit registers 26 and the (B) single bit registers 28. The single bit registers 26 and 28 are "usage" registers and are employed to keep track of the references by the computer or data processing system 12 to blocks of information in the high speed store, corresponding, of course, to addresses associated with each of the spaces 0 through 15 in the associative memory 24.

In operation, the usage registers 26 and 28 are divided into the "A" registers 26 and the "B" registers 28, which are enabled successively. More specifically, when the switch 30 selects one of the two columns A or B, the usage bit will be inserted in the corresponding single bit register to represent the particular section of the high speed memory to which reference was made.

In FIG. 2, switch 30 is shown pointing to the "B" column of registers 28. In this connection it may be noted that eight of the sixteen single bit "A" registers 26 have usage bits loaded in them. Concerning the "B" usage registers 28, however, only three bits are present. These are in the registers designated "0", "3", and "4". Now, in the event that the computer 12 of FIG. 1 selected some information from block 10 of the information in the high speed store 14, the "0" in the "B" register in column 28, in FIG. 2, would be marked with a "1".

Now, if the data processing system 12 requested information which is not included in the high speed store 14, but only in the large scale store 16, it would be necessary to transfer a block of information into the high speed store 14. The question arises as to which of the 16 blocks of information in the high speed store should be eliminated to make space for the required new information. To make this decision, the usage registers 26 and 28 associated with spaces 0 through 15 of the associative memory 24 are tested or checked for A-B bit pair of 0-0. The selection logic circuitry is arranged so that when an A-B two bit usage register, such as register No. "5" contains no usage bits, a signal is applied to the encoder 34 on the fifth (register No. 5) input line of the 16 lines designated 36 in FIG. 2. Similarly, signals are applied to the encoder on lines 36 associated with registers 9, 10, 11, 13, and 15, which also contain 0-0 in their A-B two bit usage registers. The encoder 34 provides a 4-bit address signal on leads 38 identifying a section of the high speed store 14 into which data from the large scale memory 16 is entered. The encoder 34 arbitrarily selects the lowest numbered of the above listed least recently referenced registers, in this case register 5 (although any of these least recently referenced registers would be an equally valid selection). In addition, a corresponding entry is made in the fifth (register No. 5) position of the associative memory 24, and a usage bit is inserted into the "B" register of column 28 corresponding to Table Position 5 of the associative memory.

As mentioned above, FIG. 2 shows the column 28 with only three usage bits in column 28. In addition, the addition of a fourth bit in "B" register No. 5 was mentioned. Following the access of information from four additional blocks in the high speed memory 14, so that eight bits are now set in the "B" registers, a signal is applied from circuit 42 to lead 44 to energize circuit 46. This switches a toggle switch 30 from column B to column A, or vice versa; and also initiates a reset signal indicated schematically by arrows 48 and 50 to reset the 16 registers associated with the column to which toggle switch 30 is being switched. Accordingly, all of the usage bits appearing in the 16 "A" usage registers in column 26 would be reset to "0" at the time circuit 46 is energized.

The cycle set forth above is thereafter repeated with usage bits being inserted into the "A" registers until eight are present, and the circuit 42 detects this condition and causes actuation of circuit 46 to switch to the B column, again.

The mode of operation set forth above in connection with FIG. 2 is shown in program form in FIG. 3. Following "startup" the first step as indicated by block 62 is to clear all indicator bits by a computer instruction and to select column B. Following startup and receipt of a request for data by the data processing system 12, the first question indicated by diamond 64 is "Is the requested address in the Table?" A "no" answer to this question means that a new entry must be created in the table. This is accomplished by an interrupt service routine which merely moves the requested block of information over from the large scale slow speed store 16 to a vacant space in the high speed store 14.

Blocks 82 and 84, relate to this situation where a table entry must be created. Block 82 indicates selection of the first usage register having "00" in the A and B registers, indicating that it is one of the least recently-used blocks of information in the high speed store. Block 84 indicates transfer of information from large scale memory into the selected space in the high speed store.

Returning to a portion of the sequence represented by numeral 64, a "yes" answer indicates that the requested data is in the high speed store. Block 68 refers to the step of setting or placing a usage bit in the proper single bit register associated with the block of information being utilized and also with the column, either "A" or "B" to which the switch 30 is pointing. The question presented in diamond 70 of the sequence is "Are eight bits now in the selected column?". In FIG. 2 we saw that this function was implemented by circuitry 42, 44, 46, 48, and 50, in the case of a "yes" answer, and these switching and resetting steps are enumerated in blocks 72 and 74 of the sequence diagram. The line 76, as well as lines 78 and 80 indicate return to the block 64, as additional memory addresses are accessed by the data processing system 12.

It should be noted that in connection with the drawings, particularly FIGS. 1, 2, and 3, and with the description thereof, each of the blocks of data in the high speed store is considered to have an associated block or location in associative memory 24 and usage registers 26 and 28. In actual practice, however, the high speed store could have more blocks than the associative memory and usage registers. In such a case, a separate table maintained by software contains the blocks of all data addresses in the high speed store. If accessed data is not represented by one of the blocks in associative memory 24, before retrieving data from the large scale store 14, the separate table associated with the high speed store would first be checked, and if it has the data requested, such data address is loaded into the associative memory 24 in the same manner as described above with respect to data from the high capacity store.

The detail logic circuit diagram of FIGS. 4A and 4B will now be considered. Initially it may be noted that the circuitry is shown in the form of emitter-coupled logic, or ECL. In these arrangements, each active circuit must feed into a resistor. Accordingly, the small blocks which frequently appear in the circuit diagram constitute such resistors which are regularly utilized in ECL circuitry. Incidentally, a good background on ECL-type circuits is available in a publication from Motorola, which is designated by the acronym MECL, standing for Motorola Emitter Coupled Logic. Most of the active circuits in the logic circuitry are inverters, with this being indicated, as is conventional, by the small circles following the "AND" and the "OR" circuits. In some few cases, where there is no inversion, the circle is not present. Also, the active circuits with a vertical line enclosing their left-hand side are "AND" gates, or "NAND" gates in cases where there is an inversion, while those with a concave curved line at their left-hand side, are "OR" circuits.

In emitter coupled logic, it is conventional to represent a logic "1" by a "low" voltage state and a logic "0" by a "high" voltage signal, and that convention is followed here. It should also be particularly noted that many of the inputs in the logic circuit of FIGS. 4A and 4B are normally low (logic 1) and become active by switching to the logic "0" (high) state. These inputs are indicated by a line or "bar" over the input. Thus, a "CLK" input indicates a logic 1 or low going clock pulse, while $\overline{\text{CLK}}$ indicates a logic 0 or high going clock pulse. Similarly, a "TRANSLATE" input is normally low or logic 1 and switches to a logic 0 (high) when translate action occurs.

Additionally, the letters NC appearing in the drawings refer to the fact that the associated lead is not connected to any signal source. The number "+1" appearing in the drawings after a signal or instruction indicates that that signal or instruction occurs during the first clock cycle following the indicated instruction having no such number.

In the logic circuit of FIGS. 4A and 4B the blocks 26' and 26" constitute the "A" single bit registers, and the blocks designated 28' and 28" represent the "B" single bit usage registers. These four chips are part Nos. 10155 available from Signetics.

When reference is successfully made to one of the blocks of information having an address stored in the associative memory 24 (and this action is known as a "SUCCESSFUL TRANSLATION"), one of the leads C0 through C15 is energized by the AM (associative memory) entry compare circuitry. The entry of usage bits selectively into either the A registers or the B registers is controlled by the flip-flop 92 which appears toward the bottom of FIG. 4A, which, as developed below enables the $\overline{\text{W}}$ terminal on either the A registers or the B registers. The outputs from the flip-flop 92 are labelled PTR AND $\overline{\text{PTR}}$. At the far right-hand side of FIG. 4B, the generation of "Clock A" and "Clock B" signals that are respective inputs to the A registers 26' and 26", and the B registers 28' and 28", is accomplished by the AND gates 94 and 96, which have as two of their inputs a clock signal and either PTR or $\overline{\text{PTR}}$, the mutually exclusive outputs of the flip-flop 92. The third input to AND circuits 94 and 96 is from NAND circuit 99 which has as one of its inputs $\overline{\text{RESET 1/2}}$, and other "bar" or inverse signals. The NAND circuit 99 therefore provides an output logic 1 (ENABLE CLOCK) to AND circuits 94 and 96 when one of the NAND circuit 99 inputs is activated (Logic 0) which enables the generation of a CLK A or CLK B signal. These signals (CLK A and CLK B) are applied to the $\overline{\text{W}}$ (Write) inputs to the A registers 26' and 26" and to the B registers 28' and 28" respectively.

The two other inputs to the register 26' (one of the four similar circuits) are the "SET RR" input to the "$I_o$" terminal of the chip and the "R/W mode A" input to the "$A_o$" terminal of the chip. The input to the $I_o$ terminal determines the state to which the register is set and is used to either set recently referenced (SET RR) single bits of the register to the logic 1 state, or to clear all of the bits to the logic 0 state when performing the INVALIDATE instruction or when performing a RESET 1/2. It may be noted that the NAND gate 93 at the right hand side of FIG. 4B provides the "SET RR" input, with the controlling inputs being "SUCCESSFUL TRANSLATION", "CREATE NEW ENTRY" and "READ & SET RR+1" with the significance of the line or bar being as discussed above. In addition, the "R/W Mode A" and the "R/W Mode B" inputs are generated by the OR gates 95 and 97 at the right hand side of the logic circuit.

In passing, to avoid confusion it must be noted that each of the four usage register chips 26', 26", 28', and 28" have an "$A_o$" input to which "R/W Mode A" or "R/W Mode B" signals are applied. Thus, note particularly that each of the B usage registers has an "$A_o$" terminal. Accordingly, when reference is made to information in block 4 of the high speed memory, the C4 line is energized and the Y4 register is switched to the logic 1 state in either 26' or 28' depending on the state of flip-flop 92. Of course, flip-flop 92 conforms to part of the function provided by switch 30 in the schematic showing of FIG. 2.

As pointed out above in connection with FIG. 2, when the switch 30 has selected column 26 or column 28 and one-half, or eight of the usage registers are set to the "1" state, the switch is toggled over to the other column of registers, and this second column of registers is cleared. The corresponding function is accomplished in the logic circuit of FIGS. 4A and 4B by the two programmable read-only memories or "PROMS" 98 and 100 together with the adder 102. During the clock period immediately after a $\overline{\text{SUCCESSFUL TRANSLATION}}$, $\overline{\text{CREATE NEW ENTRY}}$, or $\overline{\text{READ \& SET RR}}$ instruction the Y outputs (C0–C15) from all of the "A" or "B" registers (depending on the state of flip-flop 92) are read by the PROMS 98 and 100, and they provide binary number outputs to the adder 102 representing the number of bits which have been read from the usage registers 26' and 26". Thus, by way of specific example, let us suppose that positions Y0, Y1 and Y2 in register 26' are "marked", and accordingly, the top three leads to the PROM 98 are energized (Logic 1). Under these conditions the output from PROM 98 will be 0011 which is the binary number representing the decimal number 3. Let us further assume that the five register positions Y2 through Y6 in a register 26" contain usage bits. Accordingly, leads C10 through C14 at the input to PROM 100 will be energized and the output will be 0101, the binary number corresponding to the decimal number 5. The adder 102 sums the binary numbers 0011 from PROM 98 to 0101 from PROM 100 and obtains the binary number 1000, corresponding to 8 in the decimal system. The output on lead 104 from adder 102 is activated (Logic 1) and is applied to the AND gate 106. Upon the arrival of a suitable timing signal from a flip-flop 150 on lead 108 the inputs to flip-flop 92 are energized, thus reversing the state of flip-flop 92. Accordingly, the switch has been made from one of the sets of usage registers 26' and 26" to the other set of usage registers 28' and 28".

NOR gate 154 generates $\overline{\text{CLK RR}}$ which is a logic 0 clock pulse which occurs each time the A or B register is clocked. This signal resets a flip-flop 150 which in turn delays the toggling of flip-flops 92 and 116 until one clock cycle after a recently referred bit has been set in the A or B register.

During the first cycle after the flip-flop 92 is switched, the registers in the newly selected usage register, in this case the "B" registers 28' and 28" are reset to "0" by turning all of the input "Y" lines to the "low" or logic 1 state and applying a write pulse to the R/W leads 112 and 114 of circuits 28' and 28" respectively. At the same time the SET RR inputs to the $I_o$ terminals of B registers 28' and 28" are in the logic 0 or high state. This $I_o$ terminal of chips 26', 26", 28' and 28" controls the state to which the selected register or registers is set. The input "Y" leads are all turned low by the action of flip-flop 116, which provides a $\overline{\text{RESET 1/2}}$ signal which is one of the inputs to AND gate 117. The RESET 1/2 output at flip-flop 116 is set to a logic 0 for one clock cycle each time flip-flop 92 is switched between its outputs PTR and $\overline{PTR}$. With the output of AND gate 117, designated "INHDEC" in the drawings, providing inputs to the NAND circuits 119 and 121 in the logic 0 state, all of the outputs from all NAND circuits will be in the logic 1 (or low) state, thereby enabling all of the B registers in circuits 28' and 28" to be set to the logic 0 state.

When the data processing system 12 (FIG. 1) calls for a number not present in the high speed store 14, one of the least-recently used blocks of information must be selected. Accordingly, the lowest numbered pair of registers having both A and B bits equal to "0" is to be identified. To accomplish this function, zeros are placed at the input leads 118 and 120, and the circuits 26' and 28', and 26" and 28" are put into the "associate" mode by setting the inputs 112, 114, 122, and 124, to the "$A_o$" terminals of all four chips, all to the high or logic 0 state. Any entries with both a logic 0 entry in the A register chips 26' and 26" and also in the B register chips 28' and 28" will cause the corresponding Y line which interconnects the two registers to go "low". The encoders 126 and 128 sense the input lines to determine the lowest numbered line in which the A and B registers are both "0". The outputs from encoders 126 and 128 are combined in multiplexer unit 130 and the resultant four digit code at the output of circuit 130 is employed to identify the associative memory location into which the new entry is to be loaded. The NAND gates 152 at the inputs of encoders 126 and 128 are needed to provide proper signal conditioning to the encoders.

The two decoders 132 and 134 (as well as other circuitry) receive the coded output from circuit 130. This information is employed to identify the appropriate input Y lead to either the A or B register (depending on the state of flip-flop 92), and insert a usage bit into the appropriate single bit register. The decoders 132 and 134 apply logic 1 signals to all of the NAND gates 119 and 121 except the NAND gate associated with the selected one of the lines C0 through C15. With a logic 1 from AND gate 117, only the selected NAND gate has 0 and 1 inputs and only the selected line receives a logic 1 and is driven low to enter a usage bit in the appropriate register of chips 26', 26", 28' or 28".

The $\overline{INVALIDATE}$ input is employed to reset half of the registers when the system is turned on and initialized. This is accomplished in substantially the same manner as the $\overline{RESET\ 1/2}$ operation described above; and the $\overline{INVALIDATE}$ inputs to AND gate 117 and NAND gate 99 with the $\overline{RESET\ 1/2}$ inputs may be particularly noted.

In passing, the relationship of the NAND gate 93, which develops the SET RR signal applied to terminal $I_o$ of the A and B usage registers 26', 26", 28' and 28" should be noted. As will be recalled, the $I_o$ terminal controls the state to which the individual registers will be set when the other leads are enabled. With two direct inputs, (1) $\overline{CREATE\ NEW\ ENTRY}$, and (2) $\overline{SUCCESSFUL\ TRANSLATION}$, the SET RR signal becomes a logic 1 when these functions occur. For reset conditions SET RR will be a logic 0.

During the translation period, prior to a successful translation, neither the clock A or clock B, or the SET RR signals are enabled, and accordingly no entry or change in the A or B registers 26', 26", 28' or 28" can occur. Incidentally, the translation period during which a translation is attempted, is marked by a "TRANSLATE" or "$\overline{TRANSLATE}$" input as compared to the subsequent occurrences of a "$\overline{SUCCESSFUL\ TRANSLATION}$" which has been discussed above. This TRANSLATE condition causes the outputs of NAND gates 119 and 121 to be logic 1's so that the decoders 132 and 134 do not bias the C0–C15 lines when an address translation is attempted.

For completeness, the part numbers of certain additional semiconductor chips, in addition to Signetics' parts 10155, which are employed as the A and B registers 26', 26", 28', and 28", will now be given. Specifically, the encoder chips 126 and 128 are Signetics' part No. 10165; decoders 132 and 134 are Signetics' part No. 10162; the multiplexer 130 is Signetics' part No. 10173; and adder 102 is Signetics' part No. 10181.

In the foregoing description, one specific implementation of the present invention has been described. The actual timing of signals applied to the various logic elements must of course be consistent with the overall computing or data processing system which is being employed, such as the NCR Criterion system identified hereinabove. The matters of timing and the like are of course well known to those skilled in the logic and data processing arts. It is to be understood that the precise mode of implementation of the logic circuitry is not essential to the invention, but that it could be implemented by other similar logic systems employing different types of logic elements and systems of AND gates, OR gates, flip-flops, and logic circuits performing equivalent functions. By way of example and not of limitation, shift registers two or three binary digits in length could be used in place of each of the pairs of A and B usage registers associated with each page of the high speed memory, with a shift occurring when the input registers are fractionally filled. Similar logic substitutions could be employed elsewhere in the circuitry.

What is claimed is:

1. A data processing system, comprising:
    a low speed, large scale store, said low speed store having a plurality of memory locations for storing blocks of digital information;
    a high speed store having memory locations for storing a limited number of the blocks stored in said low speed store;
    a high speed data handling apparatus connected to receive information from said high speed store;
    means providing an "A" single bit register and a "B" single bit register associated with each block in said high speed store;
    means for initially inserting a usage bit in each "A" register as information is accessed from its associated block;
    means for sensing when approximately fifty percent of said "A" registers contain usage bits, and in response clearing said "B" registers and thereafter inserting usage bits into said "B" registers;
    means for sensing when approximately fifty percent of said "B" registers contain usage bits, and in response clearing said "A" registers and thereafter inserting usage bits into said "A" registers;
    means for selecting a block in said high speed store for replacement by sensing the lack of usage bits in said "A" and said "B" registers associated with specific blocks; and
    means for transferring information between said high speed store and said low speed store into one of the selected blocks in said high speed store.

2. A system as defined in claim 1, further comprising an associative memory having a memory location corresponding to each memory location in said high speed store, and wherein said "A" and "B" registers are associated with each memory location in said associative memory.

3. A digital system comprising:
a digital data processing unit;
a large capacity digital store having a slow access speed for storing blocks of information;
a low capacity, high-speed digital store connected for storing a limited number of the blocks of information in said large capacity store for use directly by said digital data processing unit; and
means connected between said large capacity store and said low capacity store for transferring one of the blocks from said large capacity store to said low capacity store when the one block is to be used by said digital processing unit and is not in said low capacity store, said means for tranferring comprising:
logic circuit means for selecting a block in said low capacity store for replacement by the one block from said large capacity store, including means for storing at least one usage bit of each of a first and second class in association with each block of information in said low capacity store, with the first class of usage bits representing most recent uses of associated blocks by said digital data processing unit and the second class of usage bits representing older uses of associated blocks, so that the selection of the block for replacement will be from a group of a substantial fraction of the least recently used blocks in said low capacity store.

4. The digital system of claim 3, wherein said logic circuit means further includes means for clearing all of the second class of older usage bits while retaining the first class of recent usage bits.

5. The digital system of claim 3, wherein said logic circuit means further includes means for initially selecting from the substantial fraction of least recently used blocks without regard to the prior usage of the least recently used blocks.

* * * * *